3,106,209
TREATMENT OF VEGETABLE AND OTHER LEAVES
Puzant C. Torigian, 56 Miller Ave., Floral Park, N.Y.
No Drawing. Filed Apr. 4, 1960, Ser. No. 19,516
11 Claims. (Cl. 131—2)

This invention relates to the treatment of vegetable and other leaves to impart, alter and develop desired properties of taste, odor, color and appearance, thereby broadening their spectra of usefulness.

In general, the invention modifies the properties of natural or processed vegetable and other leaves by subjecting them to controlled atmospheric and environmental conditions to favor the progress of selected enzymic reactions to attain thereby desired physical and chemical properties, after which said leaves are intermixed with an enzyme containing solution whereby they are enzymatically hydrolyzed until they acquire physical properties similar to smoking tobacco, following which they are suitably finished to a final product such as a non-tobacco smoking product having combustion products of reduced tar and resin content. When the procedure is directed to the production of a tobacco substitute, the product may be in leaf-like form for cigars or wrappers, in cut form for cigarettes or pipes, in plug or tablet form for chewing in the manner of chewing tobacco or gum or in powdered form for use like snuff. It has, moreover, been found that the enzyme-bearing solution should be maintained at a pH of 3 to 4, 4 to 5, 6 to 7 or 7 to 8 depending on the enzymes used and the characteristics desired and at a temperature in the range of 25 to 45° C. The time of processing varies considerably depending on the starting material and the product to be produced and extends up to but not exceeding about 12 hours as longer times are unnecessary and uneconomical and may cause alterative or degradative changes of undesired nature in the leaves.

Suitable starting materials for the invention include, without limitation thereto, lettuce, corn, potato, peanut and spinach leaves, i.e., vegetable leaves and mixtures thereof in all proportions.

For the enzyme-bearing solution, many enzymes can be utilized, especially proteolytic enzymes by means of which certain enzymatic hydrolyses occur. These enzymes are termed hydrolases, since they act to control hydrolysis, and are proteins or proteinaceous in nature. The proteolytic enzyme may be of natural origin such as papain, of plant or animal origin such as pepsin or may be produced from bacteriologic or fungal sources. Commercial products are available with standardized potencies such as Prolase 300 or MT 7820 of Wallerstein Division of Baxter Laboratories, which are suitable for use in this invention. All such enzymes are operative for carrying out the present procedure. The enzyme-bearing solution also contains a small amount of one or more preservatives such as methyl and/or propyl paraben in the amount of about 0.02% each. To obtain variations in flavor, taste and odor, one or more additional treatments are used with other specific enzymes as amylolytic enzymes (Mylose 100) or lipolytic enzymes (lipase), the differences in pH giving different hydrolysis products.

The substrate (material treated) varies in physical form and hence in finishing treatment. When still in leaf form after processing it can be used as such; when the processing produces pieces or particles of leaves, they are reconstituted by means of binders like starch or bleached soy flour and run through a paper-making machine (Fourdrinier) to make sheets, strips or rolls and then cut or shredded as required, depending on the desired end product and its use. The products are "smokable" and characterized by pleasant, mild taste and odor with reduced tar content in the resultant products of combustion. The products undergo more complete combustion than cured tobacco and are less toxic and less injurious, giving the effect of smoking without some of the disadvantages of smoking tobacco.

The invention is illustrated by the following non-limitative examples:

*Example I*

10 kilos of head lettuce (Iceberg or Simpson varieties) or other selected vegetable leaves are stripped of their heavy midribs and placed in piles of 4 to 6 leaves each. These piles are placed in a suitable enclosure equipped with controls permitting regulation of the atmosphere in the enclosure. The enclosure is of such size that the leaves occupy not more than approximately 25% of the cubic volume thereof. The atmosphere supplied to the enclosure and containing 250 p.p.m. or less of $SO_2$ or $NH_3$ is regulated to 75% humidity and a temperature in the range of 80 to 90° F. This atmosphere is flowed or passed through the enclosure at such a rate that the entire atmosphere within the enclosure is replaced or changed about every 10 minutes or less. The enclosure is kept substantially light-tight and the above procedure is continued until, upon inspection from time to time, the leaves acquire a color and texture resembling cured tobacco leaf, which takes not more than about 4 to 5 days. Upon attainment of these results, the atmosphere in the enclosure is modified to reduce the humidity to 60% and to increase the temperature to 100° F. while also speeding up the rate of replacement of the atmosphere in the enclosure to a complete change every 2 to 5 minutes. The temperature is raised at the rate of about 2° F. per minute until it reaches 250° F. The 60% humidity is maintained during this time. The temperature is now allowed to drop to ambient or room temperature.

The next portion of the process is carried in either of the following ways:

A. The dried leaves are crushed and made into a slurry with water, demineralized at 45° C., methyl paraben, U.S.P., 0.02%, propyl paraben 0.018% and papain. The pH is adjusted and maintained at approximately 7, adjustment being made when the pH drops to about 6 or below. The optimal amount of enzyme is about 0.05% or a little more. The enzymic reaction is allowed to continue until further reaction becomes negligible. This takes up to about 12 hours for completion. The liquor is then drained off and the substrate is resuspended in dimineralized water several times to remove undesired hydrolysis products. The procedure is repeated using 0.01% of an amylase type enzyme, again at pH 7. No further pH adjustment is usually necessary and the reaction ceases in approximately 8 hours at the 45° C. level. The substrate is again washed several times if the hydrolysis products are unwanted. The substrate is then made into "paper" using suitable binders such as starch or bleached soy flour and run through a paper-making (Fourdrinier) machine to produce a thickness of $\frac{1}{240}''$ or more. The "paper" is shredded and sprayed with tobacco flavor in a manner similar to the flavoring of ordinary tobacco and humectants and nitrates are added for imparting the desired properties.

B. When the original leaves are relatively large and possess adequate curling and bodying characteristics, which is true in the case of lettuce leaves but not of peanut or corn leaves, the leaves are immersed in the same enzyme-bearing solutions in the same sequence set forth above and washed in a similar manner. The leaves are then allowed to dry until their moisture content is reduced to 8 to 10% and then they are cased or coated with a solution made up of water in an amount equal to approximately twice the weight of the leaves, glycerine about 3%, citric acid about 0.1%, gum acacia about 0.1%, methyl paraben 0.005%, maple sugar 0.2%, sodium nitrate about 1%, 70% Sorbo 5%, and clover honey about 3%. The mixture is allowed to soak overnight and then is dried until the moisture content of the processed leaves is about 15%, following which the leaves are shredded in any suitable way. This product is now further dried until the moisture content is reduced to approximately 10% and is sprayed with an ethanol solution containing 0.005% menthol as a top spray. The product in this condition is ready to be formed into cigarettes in the conventional manner.

*Example II*

A quantity of lettuce, spinach, peanut, potato or corn leaves is selected and placed in an enclosure as described above, the enclosure being of such volumetric capacity that the leaves occupy only approximately 25% of the volume of the enclosure. The enclosure as stated above is provided with suitable controls for temperature, humidity and atmosphere changes and to exclude light of wave lengths which would affect the leaves such as ultraviolet and infra red. The relative humidity is maintained in the range of 60 to 90% and the temperature is controlled between 80 and 100° F. A small proportion of sulfur dioxide or ammonia (about 0.05%) is introduced into the atmosphere in the enclosure and the atmosphere is displaced at a rate such that it is replaced at intervals of not more than every 20 minutes. These conditions are continued until as shown by inspection, the leaves attain the general appearance of cured tobacco leaf as to texture, odor, taste and moisture content. When this condition has been reached, the environmental atmosphere is altered to effect dessication and/or torrefication by slowly lowering the relative humidity to a percentage below 60% while incrementally and gradually raising the temperature to 200 to 250° F. and at the same time speeding up the frequency of replacement of the atmosphere in the enclosure until such atmosphere is completely changed every 2 to 5 minutes. This processing is then discontinued and the product allowed to come to ambient room temperature. The product either left whole or ground to a fine state is then subjected to enzymatic hydrolysis by adding it to an enzyme-bearing solution containing any of the enzymes or types of enzymes referred to above while maintaining the enzyme-bearing solution at a pH of 4 to 5 and at a temperature in the range of 25 to 45° C. for a period of up to but not appreciably exceeding 12 hours. This substrate is then washed several times to remove undesired soluble materials. When the material is in the form of whole leaves, it is then dried until its moisture content is reduced to 10 to 15% and then the leaves are shredded. When the material is in ground form, it is made into continuous sheets or strips by any known or suitable paper making technique or machine and is then flavored and shredded and the moisture content adjusted to 10 to 15%. The shredded material is then treated in the same manner as tobacco with humectants, flavoring and coloring agents to produce a smokable product.

What is claimed is:

1. A method of treating cured leaves of leafy vegetables and plants other than tobacco to produce a non-toxic product resembling and usable like tobacco and having combustion products of reduced tar and resin content which comprises promoting the natural enzymatic reactions in the leaves under controlled temperature, pH and humidity conditions to develop a pleasing flavor, destroying said enzymes and then subjecting the leaves to further specific enzymatic hydrolysis by adding them to an enzyme-bearing solution of a proteolytic enzyme and continuing the enzymatic hydrolysis until the leaves acquire the appearance of smoking tobacco.

2. The method of claim 1 in which the enzyme-bearing solution is maintained at a pH of 4 to 5 and at a temperature of about 25 to 45° C. for a period of time up to but not exceeding about twelve hours.

3. A process of preparing from vegetable leaves a tobacco substitute suitable for smoking which comprises subjecting the leaves in an enclosure to an atmosphere containing sulfur dioxide at a temperature in the range of 80 to 100° F. and having a relative humidity of 60 to 90 percent, displacing such atmosphere at a rate such that the atmosphere is completely replaced not more than every twenty minutes until the leaves have acquired the physical characteristics of cured tobacco leaves, then lowering the relative humidity of the atmosphere below 60 percent while raising its temperature to 200 to 250° F. and eliminating the sulfur dioxide therefrom, increasing the frequency of replacement of the atmosphere, adding the thus treated leaves to an enzyme-bearing solution of a proteolytic enzyme having a pH of 4 to 5 at a temperature of 25 to 45° C. for a period of time not exceeding twelve hours, washing the resulting substrate to remove solubles therefrom and converting it into shredded tobacco-like particles having a moisture content of 10 to 15 percent.

4. The process of claim 3 in which the vegetable leaves are selected from the group consisting of lettuce, corn, potato, peanut and spinach leaves and mixtures thereof.

5. In a method of treating cured leaves of leafy vegetables capable of being converted to a smokable non-tobacco product, the step that comprises subjecting said leaves to enzymatic hydrolysis in an aqueous enzyme-bearing solution of a proteolytic enzyme at a pH of 4 to 5 and a temperature of about 25 to 45° C. for a period of time up to about 12 hours.

6. The method of claim 5 in which the enzyme is papain and the enzyme-bearing solution contains the enzyme in the amount of about 1 percent based on the weight of the leaves.

7. The method of claim 5 in which the enzymatic hydrolysis is carried out on leaves which have the physical characteristics of tobacco leaf suitable for smoking.

8. The method of claim 5 in which $SO_2$ is employed for pH control during the enzymatic hydrolysis.

9. The method of claim 5 in which $NH_3$ is employed for pH control during the enzymatic hydrolysis.

10. The method of claim 5 in which the enzymatically hydrolyzed leaves are subjected to a second enzymatic hydrolysis with an amylolytic enzyme.

11. The method of claim 10 in which the enzymatically hydrolyzed leaves are subjected to a second enzymatic hydrolysis with a lipolytic enzyme.

References Cited in the file of this patent

UNITED STATES PATENTS

| | | |
|---|---|---|
| 154,695 | Manly | Sept. 1, 1874 |
| 162,767 | Prince | May 4, 1875 |
| 862,115 | De Schweinitz et al. | July 30, 1907 |
| 1,331,331 | Erslev | Feb. 17, 1920 |
| 1,603,472 | Kahn | Oct. 19, 1926 |
| 2,217,264 | Weizmann | Oct. 8, 1940 |
| 2,644,462 | Frankenburg | July 7, 1953 |

FOREIGN PATENTS

| | | |
|---|---|---|
| 234,845 | Great Britain | Mar. 25, 1926 |

OTHER REFERENCES

Outlines of Enzyme Chemistry by J. B. Nielands and P. K. Stumpf, pages 188–189, published 1955, by John Wiley and Sons, Inc., New York, N.Y.